Nov. 3, 1959  H. E. MILLER  2,911,611
TROLLEY WIRE TAP AND CABLE GRIPPING MEANS THEREFOR
Filed Aug. 8, 1956
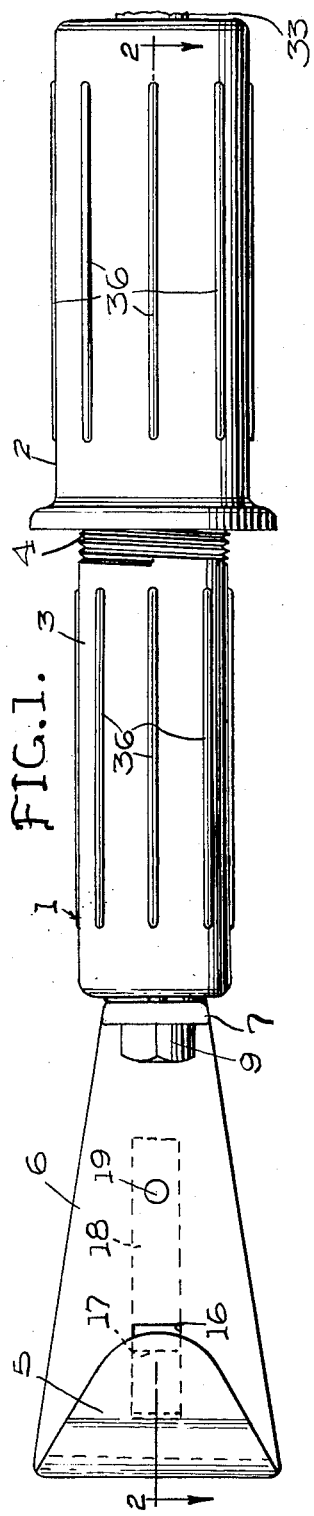
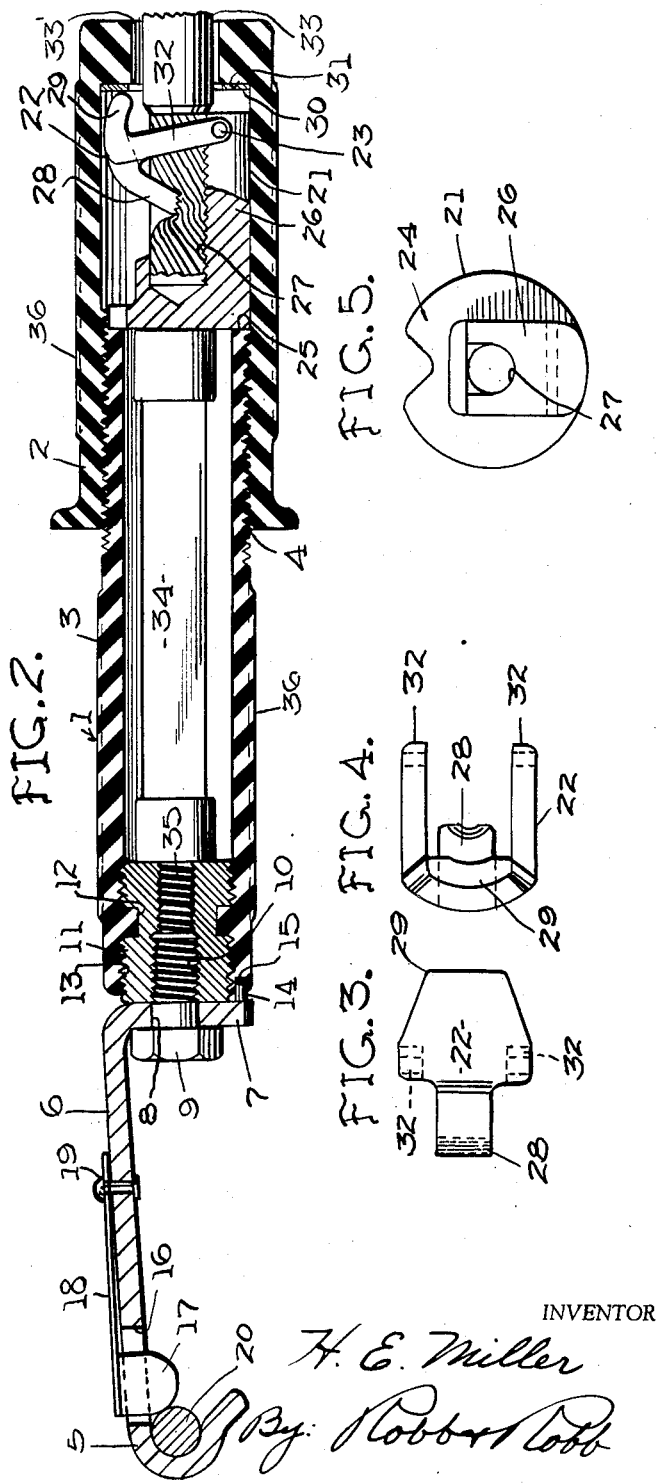
INVENTOR
H. E. Miller
By Robert Cobb
ATTORNEYS.

United States Patent Office 2,911,611
Patented Nov. 3, 1959

2,911,611

TROLLEY WIRE TAP AND CABLE GRIPPING MEANS THEREFOR

Harry E. Miller, St. Albans, W. Va., assignor to Wallace M. Hale, St. Albans, W. Va.

Application August 8, 1956, Serial No. 602,869

3 Claims. (Cl. 339—109)

The present invention relates to trolley wire taps, and more particularly to an improved trolley wire tap of the type employed in mines or the like for quick connection to power trolley wires for the transmission of electricity to electrically operated devices such as drills, lights, mining car locomotives, and the like, although it is equally suitable for other uses as a connector between a trolley or other electric power line and a conductor cable, wire or the like which may be connected to any desired electrically operated device.

An object of the invention is to provide an improved wire tap which includes novel cable gripping means adapted to securely hold one end of an electric cable in one end of the tap in such a manner that no dangerous conductive parts are exposed, thus affording safety to the user of the tap.

Another object is to provide a trolley wire tap and cable gripping means as aforesaid, wherein the cable gripping means is readily manually operated to grip a cable end upon assembly of the tap without requiring the use of wrenches, screw drivers or other tools, said tap including a housing having an end cap or closure threadedly mounted thereon, and said cable gripping means being operative to tightly grip and securely hold the end of a cable upon screwing the end cap onto the housing.

A further object is to provide a cable grip or wire terminal comprising a base member having a depression or cavity therein for receiving an end of a conductive cable, a wire or the like, a second member pivotally mounted on the base member and having a jaw adapted to grip and bite into the cable or wire and press the same tightly into the depression, said pivotal gripping member being engageable by a shiftably mounted element for rocking the pivotal gripping member about its pivotal mounting to urge the jaw into engagement with the cable or wire, and so that any strain on the cable or wire tending to pull it from the grip will cause the jaw to bite harder into the cable or wire.

Still another object is to provide a trolley wire tap having a contact hook mounted at one end of the tap and adapted to be hooked over a trolley wire, said hook having means for retaining the hook on the trolley wire, and said hook also having means for preventing loosening of its connection to the tap assembly.

Other objects and advantages will hereinafter be described or will become apparent to those skilled in the art, and the novel features of the invention will be defined in the appended claims.

In the accompanying drawing:

Fig. 1 is a side elevational view of a trolley wire tap made in accordance with the invention;

Fig. 2 is a longitudinal sectional view, as taken on the line 2—2 of Fig. 1, with certain of the parts shown in elevation;

Fig. 3 is a detail view in plan of the pivotal cable gripping jaw member;

Fig. 4 is a detail view in end elevation of the member of Fig. 3; and

Fig. 5 is a view in end elevation of the cooperative cable gripping base or jaw member.

Like reference characters in the several views of the drawing and in the following description designate corresponding parts, wherein 1 denotes a longitudinally extended cylindrical housing having a longitudinally extended generally cylindrical closure or end cap 2 threadedly mounted on the body 3 of the housing as at 4. Both the housing body 3 and the end cap or closure 2 are preferably molded of a suitable non-conductive material such as hard rubber, Bakelite, Micarta or the like, or of other suitable materials such as glass, Plexiglas, plastic or the like which may be transparent, if desired.

Contact means are provided at the other end of the housing 1, this contact means including a hook 5 adapted to engage a trolley or other power line and having a shank 6. The shank 6 is provided with a laterally disposed foot or base 7 having an opening 8 therethrough, and a cap-screw 9 or the like extends through the opening 8 into a complementary threaded socket 10 in the outer end of a brass or other conductive insert 11 which is preferably molded in this end of the housing 1. In order to prevent displacement of the insert 11, it is preferably provided with one or more seats 12 in its outer periphery into which the housing material projects, and in addition, the insert 11 may have its outer periphery suitably notched, roughened or knurled, as at 13, for engagement with the inner periphery of the housing 1. In order to prevent rotation of the hook 5 relative to the insert 11, the base or foot 7 of the hook is provided with a projection or boss 14 which projects into a cavity or depression 15 in the end of the housing body 3. Thus rotative strain on the hook cannot impart rotation to the screw 9 such as might otherwise cause loosening of the connection of the hook to the housing assembly.

As is best seen in Fig. 1, the stem 6 of the hook 5 is generally flat and diverges towards the hook end. Adjacent the hook end of the stem 6, it is provided with a central opening 16 in opposition to the terminal end of said hook. An enlargement or projection 17 at one end of a longitudinally extended flat spring 18 projects through the opening 16, said spring being riveted or otherwise suitably secured at its other end to the stem 6, as at 19. The spring-pressed projection 17 serves to retain the hook on a trolley wire or other conductor 20.

At the other end of the housing 1, novel cable gripping means are provided in accordance with the invention. Such cable gripping means is preferably disposed within the hollow closure or end cap 2 and includes a gripping base member 21 and a second gripping member 22 which is pivotally mounted upon the base member 21 as at 23. The gripping base member 21 is provided with a disc-like generally circular end 24 which is adapted to abut with the radial end face 25 of the body 3 of the housing, and extending axially from the disc-like end 24 is a longitudinally extended gripping section 26 which is preferably recessed or bored to provide a seat 27 for the bared end of a conductor cable or wire. The seat 27 is suitably knurled, ribbed or otherwise roughened to enhance its gripping action on the end of the cable or wire when such cable or wire is pressed tightly into the seat by the cable gripping member 22.

The pivotal gripping member 22 includes a jaw portion 28 adapted to project into engagement with the end of the cable or wire when the latter is disposed in the seat 27, and also includes a projecting portion 29 which is adapted to be engaged by a washer 30 of steel or other suitable material which is press-fitted in the closure or end cap 2 in abutting engagement with a shoulder 31 therein. Extended in parallel spaced relation at opposite sides of the portion 26 of the base member 21 is a pair of supporting arms 32 which are adapted to straddle the cable, wire or other conductor designated 33 and which are pivotally mounted at the free end of the portion 26 of the base member 21 and 23, as previously referred to, by means of pivot pins, screws or the like. The cable 33, or other conductor, extends through a central opening 33' in the outer end of the closure or end cap 2, and in practice would be bared of insulation at its free end for conductive contact with the respective cable gripping members just described.

The gripping members just described, as well as the insert 11 and the contact means previously referred to, are all made of electro-conductive material, while the housing is made of non-conductive material, and therefore, means is provided in the housing for establishing electrical connection between the cable gripping means and the contact means. As seen in Fig. 2, this connecting means preferably comprises a standard fuse 34. If desired, however, other types of fuses may be employed, and accordingly, the insert 11 is preferably provided with a threaded opening 35 which is adapted to receive the threaded end of a screw-in type fuse (not shown).

In the light of the foregoing, it will be noted that in order to securely clamp the end of a cable, wire or other conductor, it is only necessary to rotate the end cap or closure 2 with relation to the body 3 of the housing, and the threaded connection 4 of these parts will effect axial movement of the end cap on the body 3 so that the portion 29 of the pivotal gripping member 22 will be engaged by the washer 30 in the closure cap, and the pivotal gripping member 22 will be swung about its pivotal mounting 23. Accordingly, the gripping jaw 28 will be pressed into the bared end of the conductor 33 and will force said end of the conductor into tight engagement with the roughened surface of the recess or cavity 27. Moreover, strain on the conductor 33 tending to pull the same from the gripping means will cause further pressure to be exerted on the pivotal gripping member 22 for more tightly gripping the end of the conductor.

In order to facilitate manual relative rotation of the body 3 and the end cap or closure 2 of the housing 1, the respective parts have such axial extent as to afford an ample hand grip. In addition, the outer peripheral surfaces of the body 3 and end cap or closure 2 are preferably provided with a plurality of longitudinally extended and circumferentially spaced ribs 36 which afford an improved hand grip on the respective parts. Thus, no tools, such as wrenches, screw drivers or the like, are needed for assembly and/or disassembly of the trolley wire tap, but such operations may be effected purely manually.

While the specific details have been herein shown and described, changes and alterations may be resorted to without departing from the spirit of the invention as defined in the appended claims.

I claim:

1. In an electric line tap comprising a non-conductive housing, contact means at one end of said housing for removably connecting the tap to a power line, conductive conductor gripping means in the other end of said housing for connecting the tap to an electric conductor, and means in the housing for establishing electrical connection between said contact means and said conductor gripping means, that improvement wherein the conductor gripping means includes a gripping base member having an axially extended depression therein disposed in parallel relation to the longitudinal axis of the housing for receiving the conductor end, a second gripping member including a pair of spaced arms disposed in straddling relationship to said base member and each positively connected at one end with said base member on a fixed axis extending transversely to the depression and adjacent to one end of the base member for pivotal movements of said arms about the fixed axis, said second gripping member also having an arcuately extending jaw at its extreme end opposite to its pivotal mounting overlying and projecting toward said depression, thereby affording a maximum moment arm relative to the pivotal axis aforesaid for gripping engagement of said jaw with the conductor end to force the latter into said depression, and said housing having means for engaging the arcuately extending jaw, thereby forcing the pivotal gripping member in a direction generally axially of the housing about its pivotal mounting into engagement with said conductor end to grip the latter between the gripping means aforesaid.

2. In an electric line tap comprising a non-conductive housing, contact means at one end of said housing for removably connecting the tap to a power line, conductive conductor gripping means in the other end of said housing for connecting the tap to an electric conductor, and means in the housing for establishing electrical connection between said contact means and said conductor gripping means, that improvement wherein the conductor gripping means includes a gripping base member having an axially extended depression therein disposed in parallel relation to the longitudinal axis of the housing for receiving the conductor end, a second gripping member including a pair of spaced arms disposed in straddling pivotal relationship to said base member and each positively connected at one end with said base member on a fixed axis extending transversely to the depression and adjacent to one end of the base member for pivotal movements of said arms about the fixed axis, said second gripping member also having an arcuately extending jaw at its extreme end opposite to its pivotal mounting thereby affording a maximum moment arm relative to the pivotal axis aforesaid, said jaw overlying said depression and projecting arcuately in opposite directions therefrom for gripping engagement of the jaw with the conductor end to force the latter into said depression at one side thereof and for operative engagement with the end of the housing at the other side thereof, and said housing having coaxially extended means for forcing the pivotal gripping member in a direction generally axially of the housing about its pivotal mounting into engagement with said conductor end to grip the latter between the gripping means aforesaid.

3. In an electric line tap comprising a non-conductive housing, contact means at one end of said housing for removably connecting the top to a power line, conductive conductor gripping means in the other end of said housing for connecting the tap to an electric conductor, and means in the housing for establishing electrical connection between said contact means and said conductor gripping means, that improvement wherein the conductor gripping means includes a gripping base member having an axially extended depression therein disposed in parallel relation to the longitudinal axis of the housing for receiving the conductor end, a second gripping member of generally T-shaped form in side elevation and including a pair of laterally spaced arms extended substantially perpendicularly from the head of the T, and the free ends of said arms being positively pivotally connected to the base member on a fixed axis extending transversely to the depression in the base member, the head of second gripping member being extended generally axially of the depression of the base member and of the housing in overlying relation to the depression and projecting from opposite sides of the depending arms aforesaid, the projection at one side extending angularly with respect to the arms aforesaid toward said depression for gripping engagement with the conductor and to force the latter into said depression, and the projection at the other side extending toward and for operative engagement with the adjacent end of the housing, and said housing having coaxial means for forcing the pivotal gripping member in a direction generally axially of the housing about its pivotal mounting into engagement with said conductor end to grip the latter between the gripping means aforesaid.

References Cited in the file of this patent

UNITED STATES PATENTS

| | | |
|---|---|---|
| 411,093 | Coughlin | Sept. 17, 1889 |
| 1,484,194 | Servis | Feb. 19, 1924 |
| 1,771,270 | Normington | July 22, 1930 |
| 2,046,701 | Sandin | July 7, 1936 |
| 2,182,986 | Hixon | Dec. 12, 1939 |
| 2,555,099 | Thomas | May 29, 1951 |
| 2,657,371 | Huston | Oct. 27, 1953 |
| 2,753,541 | Leonard | July 3, 1956 |
| 2,821,690 | Miller | Jan. 28, 1958 |

FOREIGN PATENTS

| | | |
|---|---|---|
| 269,917 | Switzerland | Nov. 1, 1950 |